(No Model.) 2 Sheets—Sheet 1.
W. R. KIRK.
CAR WHEEL AND AXLE.
No. 498,171. Patented May 23, 1893.
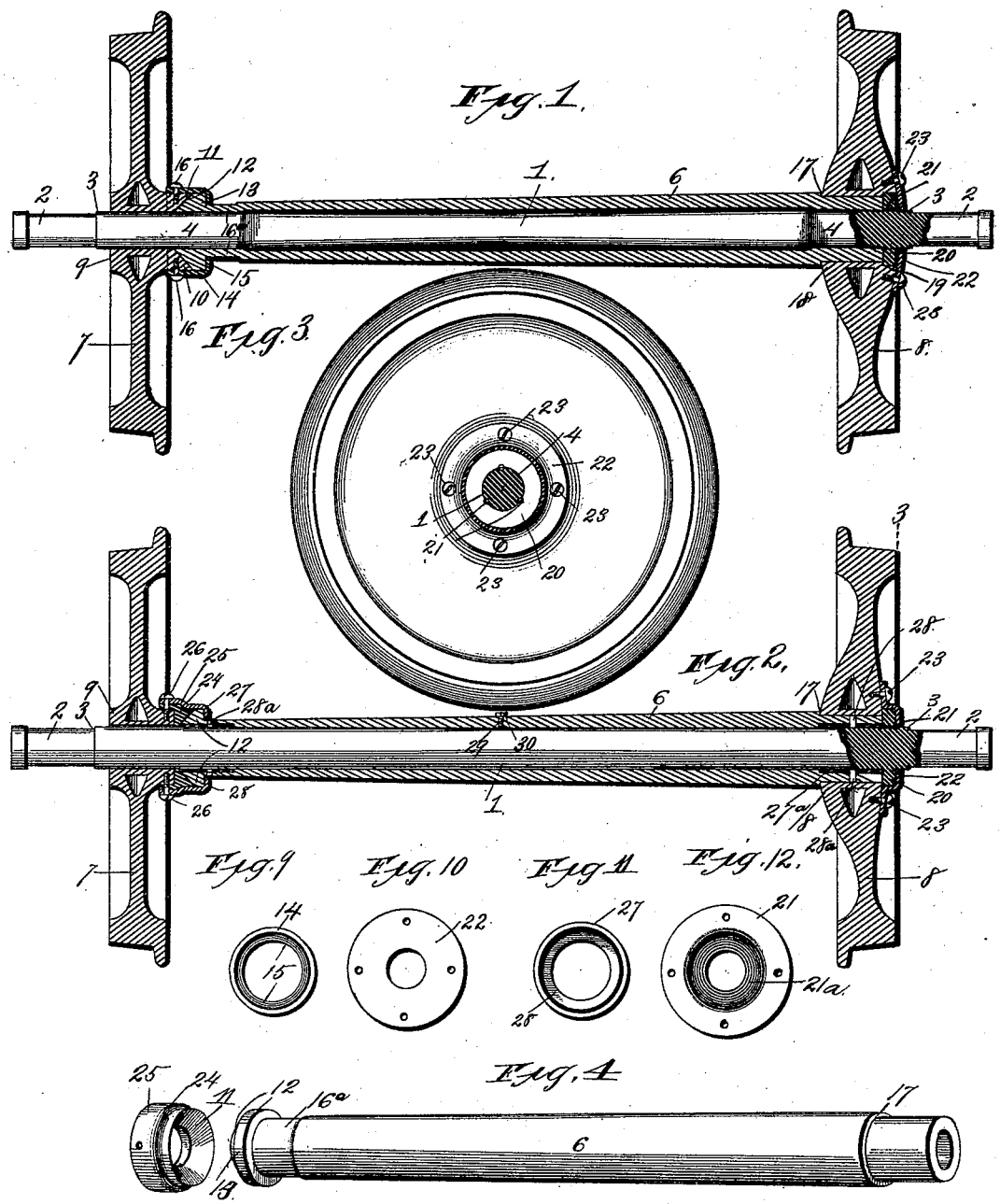

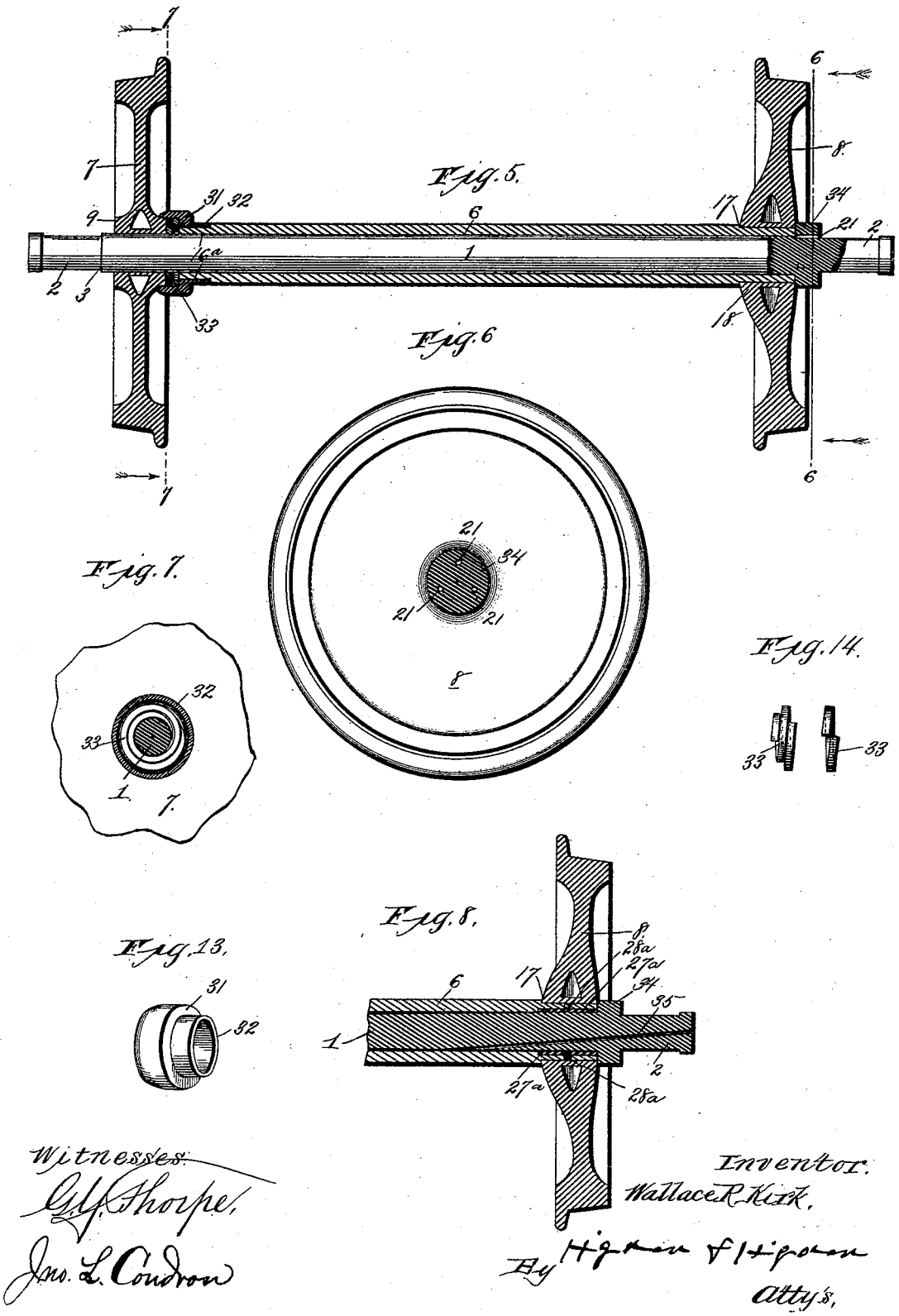

UNITED STATES PATENT OFFICE.

WALLACE R. KIRK, OF KANSAS CITY, ASSIGNOR OF ONE-HALF TO JOHN P. JACKSON, OF INDEPENDENCE, MISSOURI.

CAR WHEEL AND AXLE.

SPECIFICATION forming part of Letters Patent No. 498,171, dated May 23, 1893.

Application filed April 26, 1892. Serial No. 430,795. (No model.)

*To all whom it may concern:*

Be it known that I, WALLACE R. KIRK, of Kansas City, Jackson county, Missouri, have invented certain new and useful Improvements in a Combined Car Wheel and Axle, of which the following is a full, clear, and exact description, reference being had to the accompanying drawings, forming a part hereof.

My invention relates to the wheels of railway cars and railway vehicles generally, that is to say, such as are propelled by steam, electricity, cables, animal or manual power, or any other motive-power, and my invention relates more particularly to that type of wheels and axles which are so arranged that the wheels of each axle are capable of turning independently of each other.

The objects of my invention, are, first, to produce combined axles and wheels of the type above mentioned, in which the entire weight of the vehicle shall be borne wholly by a solid inner axle-section and which shall require no alteration of the "gage" of the axle boxes or journals now in use. Furthermore, to provide combined axles and wheels, of the said type, which shall avoid all torsional or twisting strains upon the parts of the axle and which shall cause the weight to be borne uniformly at both ends of the axle, relatively to the treads of the wheels.

A further object of my invention is to produce a combined car axle and wheels which shall have a constant movable bearing between the inner end of the hub of one of the wheels and the corresponding end of the tubular section of the axle; said connection being of such nature as to reduce the friction to the minimum, and thus render the draft as light as possible.

A still further object of my invention is to provide a cushioning and noiseless attachment for the axle which shall adapt the appliances peculiarly for use in connection with sleeping-cars, and the like.

A further object of my invention is to provide simple, complete and effective arrangements for lubricating the parts of the axle.

To the above purposes, my invention consists in certain peculiar and novel features of construction and arrangement, as hereinafter described and claimed.

In order that my invention may be fully understood, I will proceed to describe it with reference to the accompanying drawings, in which—

Figure 1 is a central vertical longitudinal section of a combined car axle and wheels embodying my invention; the inner or solid member of the axle being shown in side elevation. Fig. 2 is a similar view of the same, showing certain modifications in construction hereinafter described. Fig. 3 is a transverse vertical section of the same, on the line 3—3 of Fig. 2. Fig. 4 is a detached perspective view of the outer or tubular section of the axle, and also of the concave bearing-piece therefor. Fig. 5 is a view similar to Fig. 1, but showing certain further modifications of construction hereinafter described. Fig. 6 is a transverse vertical section of the same, on the line 6—6 of Fig. 5. Fig. 7 is a transverse vertical section of the same, on the line 7—7 of Fig. 5. Fig. 8 is a central vertical longitudinal section of one end of the axle and a corresponding transverse vertical section of one of the wheels, showing a modified form of lubricating appliance. Fig. 9 is a detached view, in end elevation, of the inner dust-guard shown in Fig. 1. Fig. 10 is a detached view, in side elevation, of the outer dust-guard shown in Fig. 1. Fig. 11 is a detached view, in end elevation, of the inner dust-guard shown in Fig. 2. Fig. 12 is a detached view, in end elevation, of the outer dust-guard shown in Fig. 2. Fig. 13 is a detached perspective view of the retaining collar for the wear spring. Fig. 14 comprises two detached views of modified forms of wear-rings used in Fig. 5.

Referring first to the construction shown in Figs. 1 and 9, 1 designates the inner member of the axle, the said member being of any suitable or preferred length to correspond with the "gage" of the axle-boxes of the vehicle, and having the usual reduced bearing-ends 2 to enter the usual bearing or axle boxes of the vehicle. It is to be observed that these reduced portions 2 extend also inward toward the middle of the axle, to points occupied by transverse annular outer shoulders 3, said shoulders 3 forming the outer ends of the middle or body portion of the inner axle-section, as shown.

6 designates the outer or tubular member of the axle, this member being of less length than the solid inner member, and being preferably of gradually increased thickness from one end to the other, as shown; the bore of said tubular member being, however, preferably of uniform diameter throughout.

7 designates one of the wheels and 8 the companion-wheel; the hub of the wheel 7 directly surrounding the corresponding end of the inner axle-member 1, and the hub of the wheel 8 directly surrounding the corresponding end of the outer tubular axle-member 6, as shown. The inner portion of the hub 9 of the wheel 7 is formed with an integrally cast extension 10, which is formed at its inner end with a conical cavity 11, the extension projecting inwardly beyond the inner side of the wheel and the inner end of the cavity communicating with the bore of the hub. At its corresponding end, the outer or tubular member 6 is formed with a conical longitudinally extending bearing-surface 12, the inclination of the faces of which corresponds with the inclination of the walls of the cavity 11, and which engage the walls of said cavity. This conical bearing-surface 12 is formed integrally upon the outer end of a head or enlargement 13, which is of greater diameter than the corresponding body-portion of the axle-member 6. It will thus be seen that the corresponding end of the tubular member 6 works in close contact with the inner end of the hub 9 of the wheel, 7, but that, owing to the described conical form of the cavity 11 and of the bearing-surface 12, the minimum of friction is attained. The hub of the wheel 7 is shrunk, welded, forced, or otherwise secured upon the end of the solid inner axle-member 1, so that the wheel 7 and said axle-member shall turn together.

If desired, the joint between the conical end of the axle-member 6 and hub 9 of the wheel 7 may be protected against the entrance of dust, dirt, cinders, and the like, by a dust-guard 14. This dust-guard is of cylindrical form, as to its outer or body-portion, and is formed with an inwardly extending circular flange or shoulder 15. The outer or body portion of the dust-guard 14 surrounds the inner end of the hub 9, and is secured thereon by any suitable or preferred number of bolts 16 which pass transversely through the body-portion of the dust-gard and radially into the hub; it being understood that the dust-guard may be secured to the hub in any other suitable or preferred manner, which will insure the turning of the guard with the hub or wheel. The inner part of the dust-guard surrounds the enlargement 12, and the flange of said guard overlies the inner end of said enlargement; the circular margin of the flange 15 fitting closely upon the corresponding outer surface of the tubular member 6. In order to produce a continuous and extended bearing of this end of the tubular member 6 upon the corresponding portion 4 of the inner solid member 1, the tubular member is rolled or otherwise treated in such manner as to reduce its internal diameter, as at $16^a$, so as to insure a close movable contact between the inner surface of the portion $16^a$ of the tubular member 6, and the corresponding portion 4 of the inner solid member 1.

As before stated, the opposite end of the tubular member 6, from that which carries the enlargement 12, is surrounded by the hub 18 of the wheel 8; the said hub being welded, shrunk, forced, or otherwise secured upon this end of the tubular member 6, so that the said member and hub shall always turn together. This end portion of the tubular member 6 is formed with a transverse annular external shoulder 17 against which abuts the inner end of the hub 18, and which serves to resist the end-thrust of the wheel upon the said member. The outer end of the hub of the wheel 8 is formed with a cavity 19, which receives an annular transverse flange or shoulder 20. This flange or shoulder 20 is preferably welded upon the outer portion of the solid member 1, but may be forged or otherwise mounted thereon so as to turn therewith. The inner side of this shoulder or flange abuts against the corresponding end of the tubular member, while said inner side of the shoulder also abuts against the inner wall of the cavity or recess 19; the said flange or shoulder, however, in no way interfering with the free rotation of the wheel 8 and tubular member 6 upon the solid member 1, nor with the revolution of said solid member within the tubular member.

If desired, a number of oil-inlet channels 21 may be formed horizontally through the flange or shoulder 20, the inner ends of said channels communicating with the inner and outer surfaces of the tubular and solid axle-members, respectively and the outer ends of said channels being exposed so as to permit the inlet of oil at the outer end of the hub and facilitate the circulation of oil.

If desired a dust-guard 22 is secured, by bolts 23, or equivalent means, upon the outer end of the hub 18, said guard closely surrounding the inner end of the corresponding bearing-portion 2 of the solid axle-member 1. It is to be understood, however, that both the oil-channels 21 and the dust-guard 22 may be omitted, if preferred, without departing from the essential spirit of my invention.

In Figs. 2 and 3, I have shown a structure which embodies the same essential features of construction as those above described, but which also involves certain structural modifications which I will now explain. In this instance, the inner end of the hub 9 of the wheel 7 extends inwardly to only the usual extent and is provided with an extension socket-piece 24 which serves the same purpose as that of the extension 10 above described. The conical bearing-cavity 11 is formed in the inner end of this extension-piece 24, and communicates with the bore of the hub 9, as before, and in this instance, the extension-piece 24 is formed at its outer end with a circular flange 25 which surrounds the inner end of the hub 9 and which is secured to said hub by bolts 26, or in any other suitable or preferred manner, so as to turn with the hub. If preferred, a dust-guard 27 may be employed in this instance also, said dust-guard surrounding the inner end of the hub and being formed at its inner end with an annular flange 28 which surrounds the corresponding end of the tubular member 6.

The dust-guard 27 may be omitted, if preferred, without departing from the essential spirit of my invention, but in any event, the corresponding end of the tubular member 6 is formed with the enlargement 13 having the conical outer bearing-surface 12 at its outer end. In this instance the outer end of the hub 18 is so formed as not to protrude outwardly from the outer side of the wheel 8; the outer face of said wheel being flattened, as compared with the wheel shown in Fig. 1. The annular flange or shoulder 20 is employed, in this instance also, and is secured upon the end of the solid axle-member 1, as before, but the recess or cavity 19 is here dispensed with; the inner side of the flange or shoulder 20 abutting against the outer side of the wheel, and also against the end of the member 6, but at the same time permitting the wheel 8 and the axle-member 6 to turn freely upon the member 1, and also permitting the member 1 to freely rotate within the member 6. The oil-channels 21 may, in this instance also be used, as shown, or dispensed with, as preferred. Furthermore, in this instance, a tubular bearing-piece 27ª, of brass, Babbitt-metal, or other suitable material, is interposed between the inner surface of the tubular member 6 and the outer surface of the solid member 1, at the corresponding extremities of the same; the said tubular bearing-piece, being secured to the member 6 by any desired number of radial rivets 28ª, as shown. An oil-inlet opening 29 is also shown as formed midway of the length of the outer tubular axle member 6, and as closed by a suitable screw-plug 30; said oil-inlet channel communicating with the inner surface of the tubular member 6 and with the outer surface of the solid member 1. It is to be understood, however, that the inlet 29 and its plug 30 may be dispensed with if preferred, and that the bore of the tubular member 6 is to be of uniform diameter throughout its length, as shown.

In Figs. 5, 6 and 7, I have shown a structure which involves the same essential features of construction as those above described, and which also embraces certain additional and modified features of construction which I will now proceed to describe; it being understood that in all of the figures of the drawings, like parts, even when not specifically spoken of in each instance, being designated by similar reference-numerals. In this instance, a collar 31 surrounds the inner end of the hub 9 of the wheel 7, said collar having its inner end formed with a circular longitudinal flange 32 which surrounds the reduced portion 16ª of the tubular axle-member 6. In this instance, the axle member 1 is of uniform diameter throughout its length, excepting the bearing sections 2. The body-portion of the collar 31 extends outwardly over the inner end of the hub 9, and the corresponding end of the tubular member 6 does not come into direct contact with the inner end of the hub 9, as before.

Between the inner end of the hub 9 and the adjacent end of the tubular member 6 is interposed a helical cushioning-spring 33, which is split at one end and which is composed either of a single convolution, as shown at the right of Fig. 14, or of two convolutions, as shown at the left of said figure, or of any desired number of convolutions. This spring surrounds the corresponding end of the axle-member 1, and is retained in position by the collar 31 and the arrangement is such that when the wheel 7 is in position, the spring is pressed perfectly flat and gradually expands as the hub and sleeve slightly wear from use so that such wear is taken up and no noise is emitted by the parts, as would be the case were the spring omitted, and the inner end of the hub 9 permitted to come in direct contact with the corresponding end of the tubular member 6, while all jarring of the parts from wear is likewise prevented. The opposite end of the inner axle-member 1 is, in this instance, formed with an external annular shoulder or flange 34 which is similarly formed as the shoulders 20 above described, but which is of considerably greater thickness than said shoulders or flanges 20. The purpose in thickening this shoulder or flange, as described, is to bring the bearing-surfaces at both ends of the axle-member 1 into uniform relation to the treads of the wheels and to the bearings of the wheels upon the axles; thus avoiding all strains of a torsional or twisting nature upon the parts of the axle and wheels. The oil-channels 21 are shown as formed through this shoulder or flange 34, and as opening in this instance into the interior of the axle-box, as before, but it is to be understood that said channels may be either used or omitted, as preferred.

In Fig. 8 I have shown a structure which involves the same essential features of construction, that are shown in Figs. 5 and 7, but in this instance, the bearing-tube 27ª is employed, as in Fig. 2, and the shoulder or flange 34 is employed, as in Fig. 5. In this instance the outer end of the axle-member 1 is formed with an oil-channel 35 which extends inward from the outer end of the axle obliquely from the longitudinal center of the axle-member, and which opens at its inner end out of one side of the axle-member, at a point near the inner end of the bearing-portion 2 of the same. It will thus be seen that the outer end of the oil-channel communicates with the interior of the axle-box, and that the oil flows through said channel between the inner surface of the outer axle-member 6 and the outer surface of the inner axle-member 1 and also between the bearing-tube 27 and the hub of the wheel 8.

From the above description it will be seen that I have produced a combined car axle and wheel which is simple, strong, durable, and inexpensive in construction, and which requires no alteration of the gage of the axle-boxes; which permits one wheel to revolve independently of the other, and which compensates for the slight wear between the hub and the end of the tubular axle-member. Normally, on straight stretches of track, the two wheels turn together, but upon curves, said wheels turn separately. In order to perfectly equalize the draft, each two axles may be so arranged that the wheel 8 of one axle shall be on the same side of the truck as the wheel 7 of the other axle.

Having thus described my invention, what I claim as new therein, and desire to secure by Letters Patent, is—

1. A combined car axle and wheel, comprising a solid inner member, a tubular outer member surrounding the inner member so as to turn freely thereon, and having an outwardly extending conical bearing-section at one end, and a wheel mounted upon the end of the inner axle-member and having a conical recess or cavity at the inner end of its hub, to receive the conical bearing-portion of the tubular member, substantially as set forth.

2. A combined car axle and wheel, comprising a solid inner member, an outer tubular member surrounding the inner member so as to turn freely thereon and provided at one end with an outward extending conical bearing-portion, a wheel mounted upon the outer end of the inner axle-member, and a bearing-piece detachably secured to the inner end of the hub of the wheel and having a conical bearing-cavity at its inner end to receive the conical bearing-portion of the tubular member substantially as set forth.

3. A combined car axle and wheel, comprising a solid inner member, having near one end an external annular shoulder or flange, an outer tubular member surrounding said inner member so as to turn freely thereon, an external annular shoulder near the end of the outer tubular member, adjacent to the end of the solid member carrying the external annular shoulder or flange, and a wheel mounted upon the outer end of the tubular member and between the external annular shoulder or flange thereof and the external annular shoulder or flange of the inner solid member, substantially as described.

4. A combined car axle and wheel, comprising a solid inner member, a wheel mounted upon one end of the solid member, a tubular outer member surrounding the inner member so as to turn freely thereon, a wheel mounted upon the end of the tubular member so as to turn therewith, and having the center of its outer side flattened, and an external annular shoulder or flange carried by the corresponding outer portion of the solid member, and abutting against said flattened surface of the wheel, and an annular dust guard secured to the outer and flattened face of the wheel and inclosing the shoulder or flange of the inner member of the axle, substantially as described.

5. A combined car axle and wheel, comprising an inner solid member, an outer tubular member surrounding the inner member so as to turn freely, a wheel mounted upon one end of the inner member so as to turn therewith, and a spring surrounding the end of the inner member and interposed between the corresponding end of the outer member and the inner end of the wheel-hub, substantially as set forth.

6. A combined car axle and wheel, comprising a solid inner member, a wheel mounted upon one end of said member so as to turn therewith, a tubular member surrounding the inner member so as to turn thereon, a cap or shield secured to the corresponding end of the outer member and embracing the inner end of the wheel-hub, and a spiral wear-spring interposed between the end of the outer member and the inner end of the wheel-hub, and also surrounding the corresponding end of the inner member, and surrounded by the cap or shield, substantially as set forth.

7. A combined car axle and wheel, comprising an inner solid axle member having an oil-channel extending obliquely inward from its outer end and opening at its inner end through the side of the axle member, and a tubular axle member surrounding the inner axle member so as to inclose the inner end of the oil-channel and so, also, as to turn freely upon the inner axle member, substantially as set forth.

In testimony whereof I affix my signature in presence of two witnesses.

WALLACE R. KIRK.

Witnesses:
JNO. L. CONDRON,
H. E. PRICE.